INVENTOR.
CARL W. HANSEN
BY Watts & Fisher
ATTORNEY 3,316,434
WINDOW SUPPORT STRUCTURE FOR AN X-RAY
FLOW COUNTER
Carl W. Hansen, Chagrin Falls, Ohio, assignor to Picker X-Ray Corporation, Waite Manufacturing Division, Inc., Cleveland, Ohio, a corporation of Ohio
Filed Sept. 6, 1963, Ser. No. 307,133
7 Claims. (Cl. 313—93)

The present invention relates generally to X-ray devices and more particularly to a flow counter for measuring X-radiation.

"Soft" radiation is the low wave length radiation emitted by and characteristic of elements having molecular numbers up to 20 or 21 on the periodic table. With the present state of the art, most soft radiation studies utilize the art of spectroscopy while a few types of diffraction studies employ soft radiation.

Soft radiation studies cannot be conducted successfully in an air atmosphere. Accordingly, these studies are customarily conducted in a suitably enclosed helium atmosphere, and the radiation to be measured and detected is directed into a device known as an X-ray flow proportional counter. Flow counters have ionization chambers to detect these low energy X-rays.

Soft X-rays are of such a low energy level, often one or two kilovolts, they cannot penetrate many materials. For example, soft rays will not penetrate the customary beryllium windows of scintillation counters used as detectors with diffraction apparatus. The ionization chamber of the flow proportional counter is separated from the helium atmosphere by a window which is transparents to the soft X-rays. The window is usually a replaceable plastic film, which must be very thin and flat to avoid distortion of a beam of X-rays. Plastic films of minimum thickness are generally extremely flexible and frangible. For this reason, it has, in the past, been quite difficult to tension these windows properly across window openings in counter units.

The present invention provides a counter window constrcution which isotropically tenses and stretches the film across the window opening. With this construction, a thin membrane window is placed between a wall of the ionization chamber and a retaining plate. An O-ring is disposed between the window and the retaining plate. The O-ring is in contact with the window and the two are frictionally connected. The retaining plate includes a tapered, frusto-conical surface which engages the O-ring. When the plate is moved toward the wall, the tapered surface causes the O-ring to roll outwardly drawing the window with it as it is stretched by the tapered surface. The action of the plate on the O-ring provides tensing of the window in at least three manners. First, the movement of the O-ring up the tapered surfaces stretches the O-ring increasing its diameter. This increase in diameter tenses the frictionally connected film from the center outward. Second, as the O-ring rolls on the frusto-conical surface of the retaining plate the rolling ring tends to draw the window isotropically, radially outwardly in all directions. Finally, when the retaining plate clamps the O-ring against the wall, the O-ring is flattened somewhat, extruding radially outwardly to further tense the window.

In some studies it is desirable to measure both soft and hard radiation. For this reason a second window opening, aligned with the first, is provided on the opposite side of the ionization chamber. This second opening is usually covered with a thin membrane of a material such as aluminum which is transparent to hard radiation but opaque to soft radiation.

Accordingly, while the preceding discussion has been directed to the primary problem, the tensioning of a plastic film, the invention has as its principal objectives the provision of a novel and improved method and apparatus for tensioning a flexible mebrane across an opening.

Other objects and a fuller understanding of the invention may be had by referring to the following description and claims taken in conjunction with the accompanying drawings in which:

Figure 1:
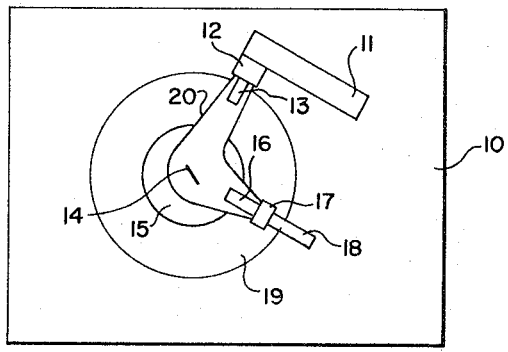
FIGURE 1 is a schematic view of a spectrometer.

Referring now to the drawings and FIGURE 1 in particular, a spectrometer housing is shown generally at 10. An X-ray tube 11 is mounted on the housing and positioned to excite a specimen carried by a specimen holder 12. In spectroscopy the energy from the X-ray tube 11 is useful to excite a specimen on the holder 12 and cause the specimen itself to emit X-rays characteristic of the specimen. The specimen emitted X-rays 12 pass through a conventional collimating structure 13 and are directed against a crystal 14. The crystal 14 is mounted on a rotatable structure 15 known as a theta member. The theta member 15 rotates through a predetermined angle during the study.

Rays diffracted by the crystal 14 are directed through a Soller slit structure 16 coupled to a flow counter 17. A scintillation detector 18 is connected to the flow counter on the side opposite the Soller slit and in alignment with the slit. The Soller slit 16, the flow counter 17, and the detector 18 are coupled together and mounted on a second rotatable member 19 known alternately as a two theta member or an omega member. The flow counter 17 and the connected structures 16 and 18 rotate together through an angular motion which is twice as great as the rotation of the crystal 14 so that the slit, counter, and detector, 16, 17, 18, are maintained in appropriate position to receive rays diffracted by the crystal 14. The structure shown schematically in the drawings is for conducting a study with soft radiation. Accordingly, an enclosure 20 is provided to maintain an appropriate atmospheric environment for the transmission of the soft rays emitted by a specimen in the holder 12.

The schematic structure thus far described is described for environmental purposes and should not be construed to be a description limiting the invention. The schematically described structure is typical of many types of known spectroscopy structures. The invention is usable with any such structure, and, in appropriate studies with known diffraction apparatus as well.

Figure 3:
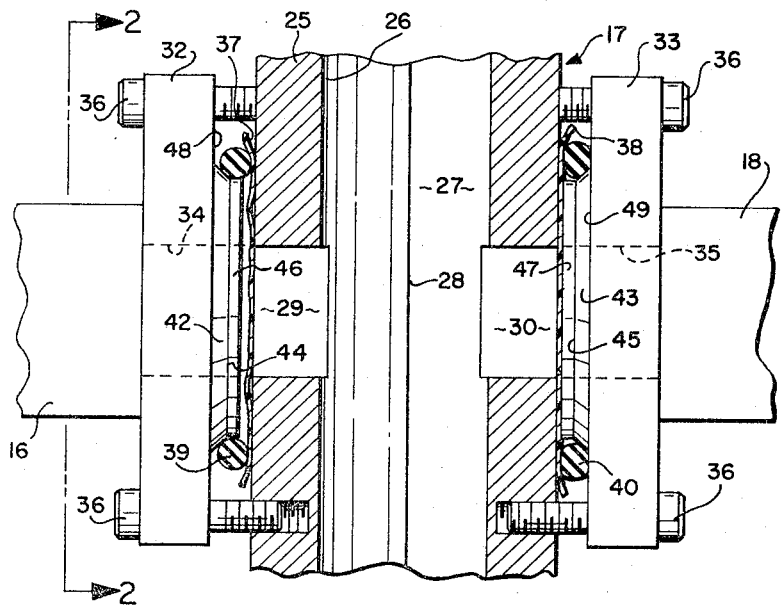
FIGURE 3 is an enlarged fragmentary view showing a flow counter in cross section as seen from the planes indicated by the lines 3—3 of FIGURE 2 and showing two window positioning members in side elevational view; and, FIGURE 4 is a greatly enlarged fragmentary sectional view in the plane of FIGURE 3 showing the tensioning action of an opening as the window positioning member is clamped in place.
Figure 2:
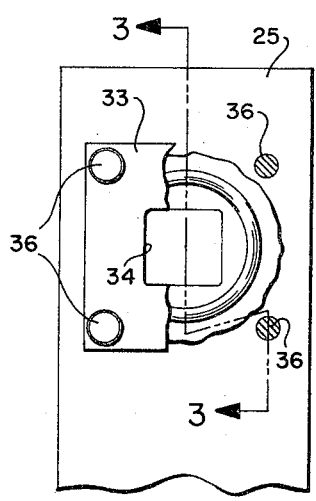
FIGURE 2 is a fragmentary side elevational view with parts broken away and removed of a flow counter as seen from the plane indicated by the line 2—2 of FIGURE 3.
Figure 4:
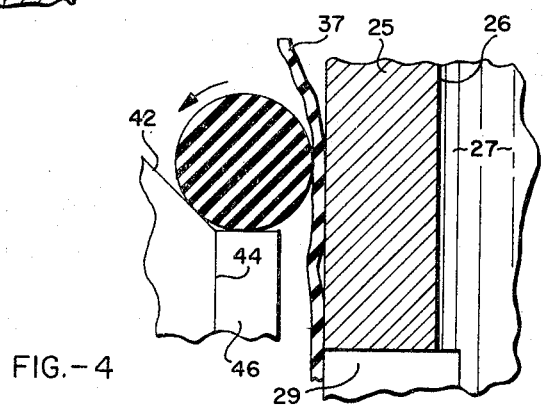

Referring now to the FIGURE 2 through 4, the flow counter 17 has a housing 25. The housing 25 has a usually vertically oriented elongated cylindrically contoured wall 26 defining an ionization chamber 27, FIGURE 3. The usual flow counter detection wire 28 extends axially through the chamber 27.

The housing 25 has aligned inlet and outlet X-ray window openings 29, 30. The openings 29, 30 are rectangular in contour, aligned, and formed on opposite sides of the ionization chamber 27. Soft radiation transmitted from the crystal 14 will pass trough the opening 29 into the ionization chamber. Where a scintillation detector 18 is used and when one wishes to study both the hard and soft radiation, hard radiation is passed from the window opening 29 through the ionization chamber 27, and then out the window opening 30.

A pair of retaining plates 32, 33 are respectively suitably secured to the ionization chamber housing 25 as by plate connection screws 36. The retaining plates 32, 33 are equipped respectively with through X-ray transmitting apertures 34, 35. The X-ray apertures 34, 35 are preferably rectangular and of a size corresponding to the window openings 29, 30. The apertures 34, 35 are aligned with the window openings 29, 30 so as to provide a continuous passage of uniform dimension for the transmission of hard X-rays from the Soller slit 16 through the flow counter 17 and into the detector 18.

In order to prevent the migration of helium from the helium atmosphere through the window opening 29 and into the ionization chamber 27 and migration of ambient aid through the window opening 30 and into the ionization chamber 27, it is necesary to close the openings with suitable sealed, fluid impervious windows. In order to avoid ununiform attenuation and absorption of the X-rays energy transmitted through these windows, it is important that the windows be absolutely flat and tensioned tautly across the window openings 29, 30. The window closing the inlet opening 29 is designated by the numeral 37 and will, as suggested above, be composed of a material which is transparent to both hard and soft radiation. The preferred material for this window is a flexible thin transparent plastic such as polyethylene terephthalate or, as it is sometimes known, the glycol ester of terephthalic acid. As is further suggested above, the window across the outlet openings, which is designed by the numeral 38, will preferably be of a material which is opaque to soft radiation but transparent to hard radiation. Thus, the outlet window 38 is an X-ray filter and composed of a suitable metal material such as aluminum or beryllium.

Though the inlet window 37 is plastic and the outer window 38 is usually metallic, both are thin, flexible membranes which must be tensioned tautly across their respective X-ray window openings. From time to time, it is necessary to change the windows to provide windows of different materials for different studies. It is also necessary from time to time to replace windows which become defective for one reason or another such as breakage due to the fragile nature of the windows. For these reasons, it is desirable to provide a structure which permits facile and simple window replacement. Previously the replacement of a window in a flow counter has been an arduous and tedious process since the window must be tensioned very carefully to make it absolutely flat and taut and at the same time to avoid the possibility of tearing or otherwise damaging the window.

To effect uniform tensioning of the window, endless elastic and resilient tensioning members 39, 40 are employed. The tensioning members 39, 40, in their preferred and disclosed form, are natural or synthetic rubber O-rings.

The retaining plates 32, 33 are respectively equipped with tapered camming projections 42, 43. The camming projections 42, 43, are oppositely oriented each being directed toward the flow counter housing 25 with their respective smallest diameter ends 44, 45, positioned nearest the counter housing 25. Preferably the camming projections 42, 43, are frusto-conical and positioned symmetrically about the aligned passages and openings 34, 29, 30, 35.

The plates 32, 33, respectively include cylindrically contoured O-ring holding sections 46, 47. The cylindrical sections are axially aligned with the camming projections and extend respectively from the small ends 44, 45, toward the counter housing 25. In FIGURE 3 the inlet window structure is shown positioned for tensioning of the inlet window 37 but prior to that tensioning. The outlet window structure is shown with the window 38 tensioned and the structure in a fully assembled condition. FIGURE 4 is an enlarged fragmentary view showing the structure with the window partially tensioned to demonstrate the action of the tensioning members as the tightening is affected.

The assembly of the window 37 will be described, it being recognized that the tensioning process for tensioning the window 38 is identical. The window 37 is first positioned across the opening 24 and manually smoothened and flattened to its approximate desired finished condition. The tensioning O-ring 39 is then positioned on the O-ring holding section 46. The retaining plate 32 is then positioned to bring the O-ring into frictionally connected contact with the window 37 and with the O-ring preferably disposed symmetrically about the window opening 29. Thus, the window is sandwiched between the O-ring 39 and the counter housing 25. The plate screws 36 are then threaded into the housing and gradually and uniformly tightened to draw the retaining plate 32 inwardly until the O-ring holding section 46 abuts the window pressing it against the outer face of the chamber housing 25.

As the retaining plate 32 is drawn inwardly by the tightening of the plate screws 36 a triple action of the tensioning member 39 tautens the window 37 smoothly and tightly across the opening 29. FIGURE 4 depicts two of these three actions. As the retaining plate is drawn toward the ionization chamber housing 25, the O-ring will roll up the tapered surface of the camming portion 42. As it rolls up this tapered surface, the O-ring tends to rotate as indicated by the arrow in FIGURE 4. Thus at all points around the camming projection 42 the O-ring is tending to roll up the projection and, therefore, roll outwardly. Since the O-ring is frictionally connected with the window 37, this outward rolling draws the window with it uniformly and isotropically tensioning the window radially outwardly in all directions. Further, since the camming surface 42 is tapered outwardly, the diameter of the O-ring 39 is being continually increased as it rolls up the surface of the camming projection 42. Since the diameter of the O-ring 39 is increasing and since it is frictionally connected to the plastic window 37, a further radial outward tensioning of the window is obtained.

The final tensioning of the window is obtained as the O-ring section 46 is drawn into contact with the chamber housing 25. As is shown in connection with the outlet tensioning member 40, the tensioning member is of a diameter greater than the combined axial length of the camming portion 43 and the O-ring holding section 47. When the retaining plates are drawn in, as shown in connection with the retaining plate 33, until the O-ring holding sections abut the chamber housing 25 the O-rings are respectively squeezed between the counter housing 25 and clamping surfaces 48, 49 on the plates 32, 33, and become somewhat flattened or extruded. Since the camming projections and holding section prevent inward extrusion, this flattening or extruding of the O-rings forces portions of the O-rings outwardly, further tensioning the windows.

While the invention has been described with particularity, it is believed it essentially comprises a method and apparatus for providing tight windows for inlet and outlet openings of a flow counter ionization chamber.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. An X-ray proportional counter comprising:
 (a) a housing including a wall member defining an ionization chamber and a communicating window opening;

(b) a retaining plate member connected to the wall member and having an aperture aligned with said opening;

(c) a flexible X-ray window disposed between said members;

(d) an endless resilient tensioning element frictionally connected to said window and between the window and one of said members;

(e) securing means connected to the members for drawing said members together to press said element against said window and compress the element; and, (f) said one member having a tapered surface engaging said element to tension the element and the frictionally connected window, said tapered surface being positioned to increase such tension as the members are drawn together by the securing means.

2. The device of claim 1 wherein said one member includes a means extending toward the other of said members from said tapered surface to maintain said element in position for assembly prior to securing the members with said securing means.

3. An X-ray proportional counter comprising:
(a) a housing including a wall member defining an ionization chamber and a pair of aligned communicating window openings on opposite sides of the chamber;

(b) first and second retaining plate members each connected to the wall member and having an aperture aligned with a different one of said openings;

(c) a pair of flexible X-ray windows each paired with a plate member and disposed between the paired plate and wall members;

(d) a pair of endless resilient tensioning elements each frictionally connected to one of said windows and between the frictionally connected window and an adjacent one of said members;

(e) securing means connected to the members for drawing each of said plate members together with the wall member to press said elements against said windows and compress said elements; and, (f) each said adjacent member having a tapered surface engaging the frictionally connected element to tension the element and the frictionally connected window, said tapered surface being positioned to increase such tension as the members are drawn together by the securing means.

4. A window structure comprising:
(a) a wall member with an opening therein;
(b) a retaining plate member adjacent said wall member and having an aperture aligned with said opening;
(c) a flexible sheet of plastic film disposed between said members, and covering said opening, and overlying the wall portion defining said opening;
(d) an O-ring surrounding the opening and abutting the sheet with the sheet between the O-ring and the opening;
(e) clamping means drawing said retaining plate member toward said wall member and compressively clamping said O-ring against said sheet; and,
(f) said plate member having a separate portion with a tapered surface engaging said O-ring and radially tensioning said O-ring outwardly against said sheet to isotropically tension said sheet across said opening.

5. The window structure of claim 4 wherein said separate portion is a frusto-conical section having a small end and wherein the diameter of the small end is larger than the internal diameter of the O-ring when the O-ring is in a relaxed condition.

6. A soft X-ray flow proportional counter comprising:
(a) a housing including a wall defining an ionization chamber, said wall having aligned openings for permitting the flow of X-rays into and through said chamber;

(b) retaining plates disposed adjacent said wall and each having an aperture aligned with one of the openings;

(c) a pair of resilient, fluid impervious sheets of soft X-ray pervious material each disposed between one retaining plate and the wall, each sheet overlying a portion of the wall and covering the associated opening;

(d) a pair of resilient O-rings each disposed between one sheet and the associated retaining plate around said openings;

(e) a securing means connecting each plate to the housing and adaptable to draw said plates toward the wall and compress the O-ring; and, (f) said plates each having a tapered surface engaging the associated one of said O-rings and distending said ring and said sheet radially outwardly when the associated plate is drawn toward the wall.

7. In a flow counter apparatus the combination of:
(a) a flow counter housing defining an internal ionization chamber and an X-ray window opening communicating with the chamber, said housing having an outer window sealing surface surrounding the opening;

(b) a flexible, fluid impervious, X-ray permeable membrane covering said opening and abutting said window sealing surface in circumscribing engagement around the opening;

(c) an O-ring abutting the membrane with the membrane sandwiched between the O-ring and the window sealing surface;

(d) a window retaining and distending plate including a through X-ray aperture aligned with said opening, said plate having a clamping surface generally paralleling the window sealing surface and having a camming projection extending outwardly from the clamping surface toward said housing;

(e) said projection including a frusto-conical shaped portion having its larger end near said clamping surface and its smaller end nearest the housing;

(f) said projection also having a cylindrically contoured section extending axially outwardly from the small end of said frusto-conical shaped portion toward said housing, said cylindrically contoured section abutting said membrane;

(g) said frusto-conical shaped portion abutting and distending said O-ring outwardly whereby to extend the O-ring and thereby tension the sheet;

(h) said O-ring being squeezed between said surfaces and distended and extruded outwardly to further tension the membrane; and, (i) means clamping said housing and said plate together.

References Cited by the Examiner

UNITED STATES PATENTS

| | | | |
|---|---|---|---|
| 2,730,637 | 1/1956 | Atlee | 313—74 X |
| 2,837,656 | 6/1958 | Hendee et al. | 313—93 X |
| 2,925,509 | 2/1960 | Hayes | 313—93 |
| 3,039,362 | 6/1962 | Dobrowolski | 88—113 X |
| 3,132,249 | 5/1964 | Maggio et al. | 313—93 X |
| 3,180,987 | 4/1965 | Cunningham et al. | 250—49.5 |

FOREIGN PATENTS 829,695    3/1960    Great Britain.

JAMES W. LAWRENCE, *Primary Examiner.*

P. C. DEMEO, *Assistant Examiner.*